(12) United States Patent
Schroeder-Perry et al.

(10) Patent No.: US 6,229,265 B1
(45) Date of Patent: May 8, 2001

(54) ELECTROLUMINESCENT DISPLAY OF LINE SEGMENTS

(76) Inventors: Becky J. Schroeder-Perry, 1343 Corbin Rd, Toledo, OH (US) 43612; Charles F. Schroeder, 2317 Valleybrook Dr., Toledo, OH (US) 43615

( * ) Notice: Subject to any disclaimer, the term of this patent is extended or adjusted under 35 U.S.C. 154(b) by 0 days.

(21) Appl. No.: 08/477,893

(22) Filed: Jun. 7, 1995

Related U.S. Application Data

(63) Continuation-in-part of application No. 07/245,894, filed on Sep. 19, 1988, now abandoned, which is a continuation of application No. 07/140,578, filed on Jan. 4, 1988, now abandoned, which is a continuation of application No. 06/316,989, filed on Nov. 2, 1981, now Pat. No. 4,725,761, which is a continuation of application No. 06/046,103, filed on Jun. 6, 1979, now abandoned, which is a continuation-in-part of application No. 05/796,896, filed on May 16, 1977, now abandoned.

(51) Int. Cl.⁷ ..................................................... H01J 13/56
(52) U.S. Cl. ........................ 315/169.3; 313/502; 313/503; 313/505; 313/498
(58) Field of Search .................. 315/169.3; 313/498–512

(56) References Cited

U.S. PATENT DOCUMENTS

| 3,194,003 | 7/1965 | Polin .............................. 340/781 X |
| 3,258,906 | 7/1966 | Demby ................................ 368/240 |
| 3,328,790 | * 6/1967 | Rhodes ............................... 415/505 |
| 3,594,610 | * 7/1971 | Evans ................................ 315/169.3 |
| 3,885,196 | 5/1975 | Fischer ........................... 340/781 X |
| 4,204,349 | 5/1980 | Heynisch ............................ 368/240 |
| 4,238,793 | 12/1980 | Hochstrate .......................... 340/781 |
| 4,266,164 | * 5/1981 | Schroeder ......................... 315/169.3 |

* cited by examiner

Primary Examiner—Michael B Shingleton

(57) ABSTRACT

A laminar electroluminescent EL display formed of aligned side-by-side light line segments adaptable to providing a raster-like screen for information such as liquid crystal information generated in overlying relationship with the display area. The electrically energized line segments of light emitting matter can be deposited in aligned grooves in a common electrode and individual opposite electrodes for each of the line segments are aligned in an overlying carrier matched to the lines of light emitting matter.

17 Claims, 2 Drawing Sheets

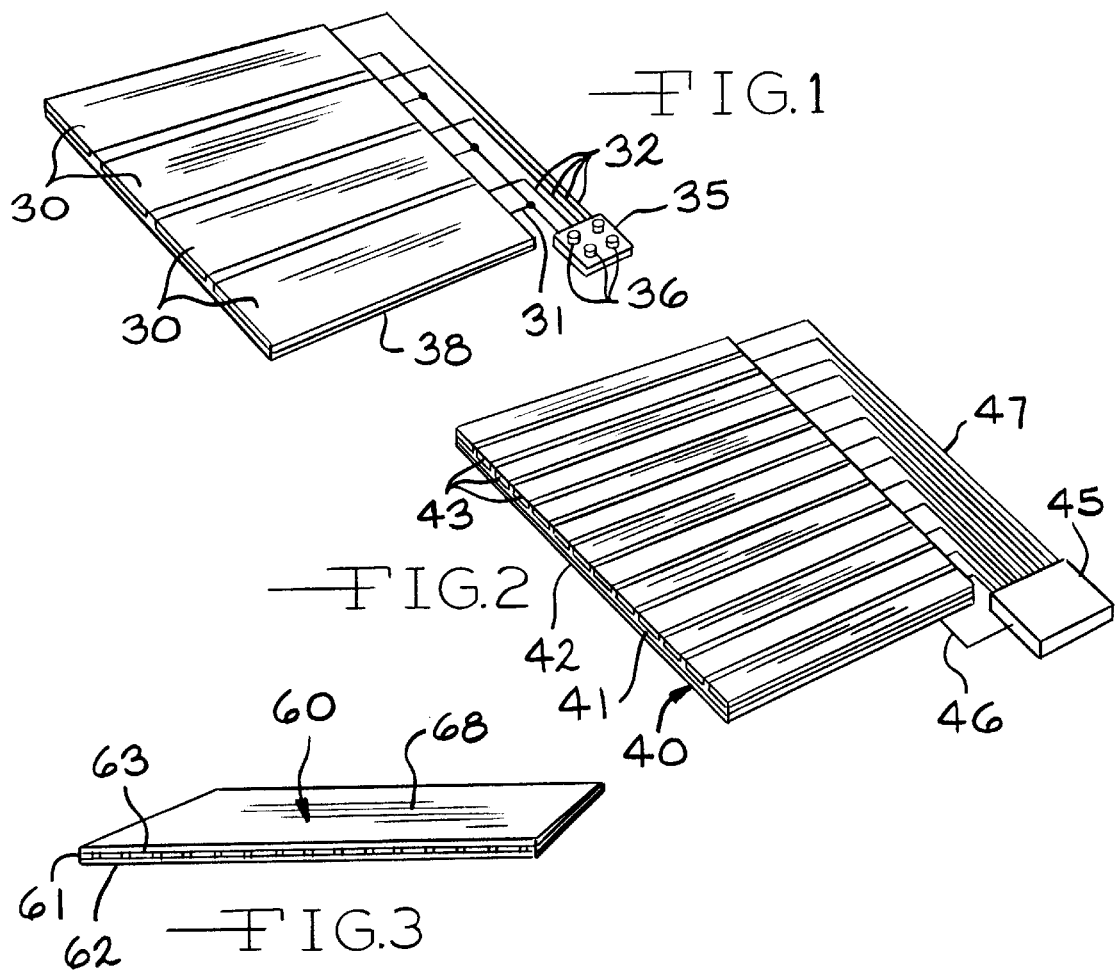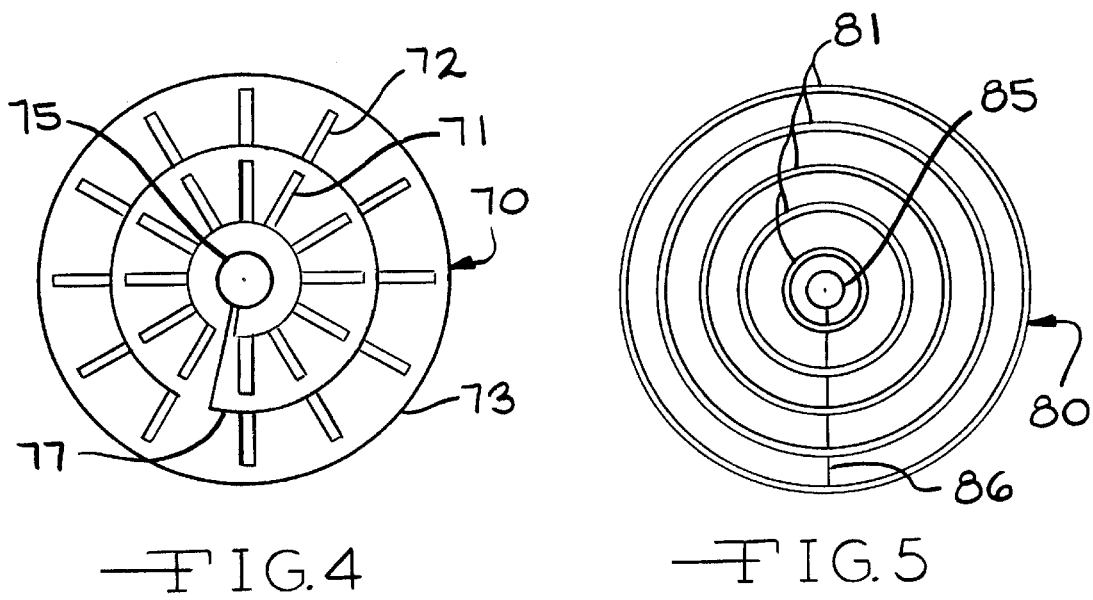

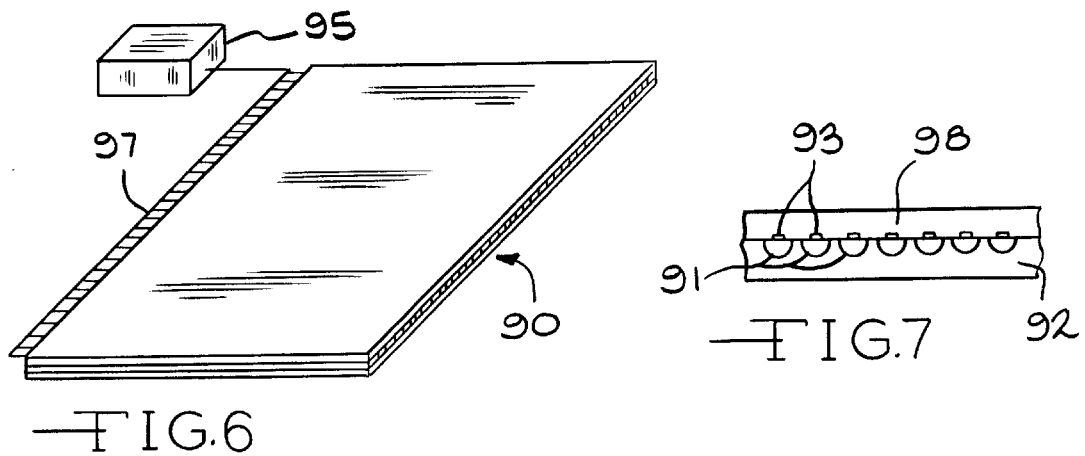
FIG. 6
FIG. 7
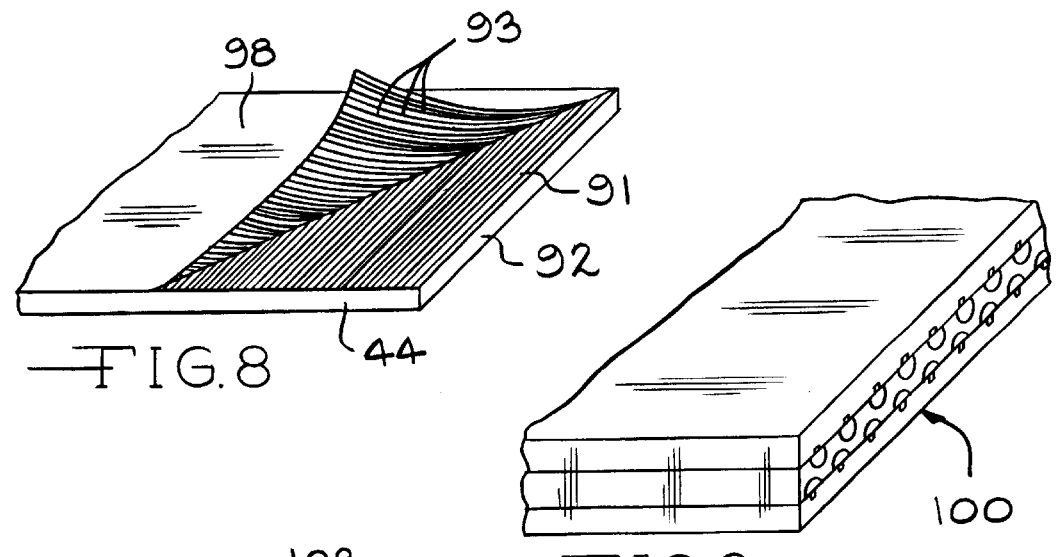
FIG. 8
FIG. 9
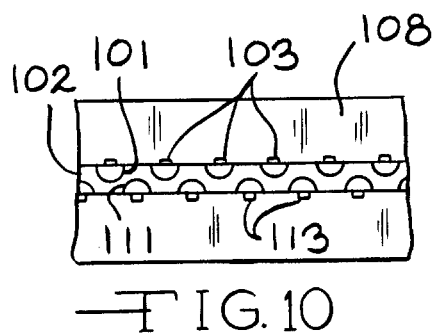
FIG. 10
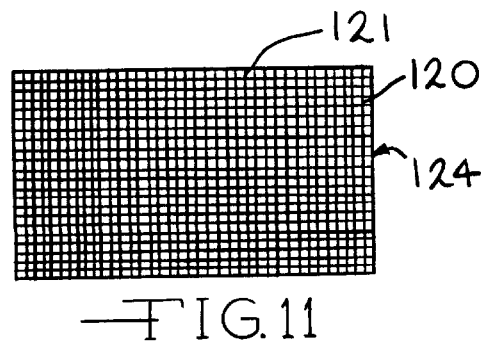
FIG. 11
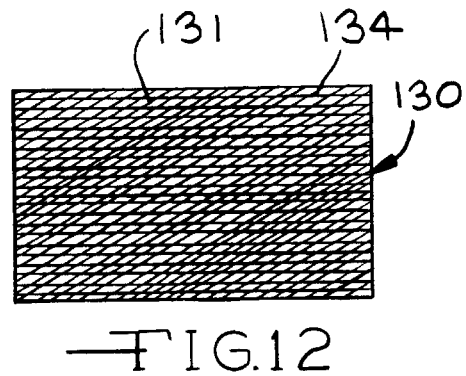
FIG. 12

ELECTROLUMINESCENT DISPLAY OF LINE SEGMENTS

This is a continuation in part of application Ser. No. 07/245,894 filed Sep. 19, 1988, abandoned; which is a continuation of application Ser. No. 07/140,578 filed Jan. 4, 1988, abandoned; which was a continuation of application Ser. No. 06/316,989 filed Nov. 2, 1981, now U.S. Pat. No. 4,725,761; which was a continuation of Ser. No. 06/046,103 filed Jun. 6, 1979, abandoned; which was a continuation in part of Ser. No. 05/796,896, filed May 16, 1977, abandoned.

This invention relates to an electroluminescent display formed of a plurality of electroluminescent (EL) line segments aligned side-by-side to form a display area of light segments adaptable to providing a raster-like screen for information such as liquid crystal information presented in a layer overlying the display area.

In our prior patents, electroluminescent display areas have been disclosed including electroluminescent panel assemblies as set forth in our U.S. Pat. No. 4,024,404 issued May 17, 1977 and U.S. Pat. No. 4,725,761 issued Feb. 16, 1983 in the latter of which a plurality of independently activatable energized light emitting strips are aligned in side-by-side relation to form an integrated light field. Within the context of such disclosure and that of co-pending application Ser. No. 07/245,894 filed on Sep. 19, 1988, the present invention deals with formation of electroluminescent display areas formed of closely spaced narrow EL line segments which form a display area of thin lines of light which can be activated to provide a light field for information superimposed or overlying the field.

BRIEF DESCRIPTION OF THE INVENTION

The line segments of the present invention are electrically activated closely spaced lines of light emitting material provided with a common electrode on one side and each segment being provided with its own individual electrode on the opposite side, whereby the line segments can be activated selectively individually or in sequence to provide a desired light effect. All can be activated simultaneously or can be individually activated on and off in sequence such as by a pulsed signal at a frequency of sequential repetition which will provide the effect of an overall unified or integrated light area reliant upon the eye persistence of a viewer. That is, the frequency of sequencing and repetition of sequencing of activation of the adjacent light line segments is adequate to produce the effect of a continuously lit unified area of the plurality of short bursts of light from the plurality of adjacent light segments.

In another form of the invention the common electrode can be sandwiched as a common electrode between two opposite layers of such individually activatable light segments, each layer of light segments also being activatable simultaneously or preferably in on-off sequence effective to provide to a viewer an overall unified lighted area due to the eye persistence of the viewer. The common electrode can be a light transmissive or a light transparent electrically conductive layer so that light from both layers of EL line segments can be complementary in providing desired light effects from one or both sides of the bank of EL line segments.

In still another form of such arrangement the EL line segments of two opposite layers can be aligned in parallel relation, each layer being staggered from the other with light segments on the opposite side layer, thereby to complementarily enhance the light output of the layers with each other.

In a still further form of the invention, the light segments on opposite layers can be aligned in crossed relation, either diagonally or right angularly, with light segments being activatable either individually or in sequence to provide a unified coherent light field or a variety of different desired light effects.

It is an object of the present invention to provide an energy efficient light screen for lighting purposes and more particularly adaptable to providing light to enhance the visibility of superimposed information either in pictorial, graphic or written form.

Still another object of the invention is to provide a light output with a minimum distributive power source to make intelligible matter visible at a low cost and with a minimum power consumption.

A still further object of the invention is to provide a light-weight planar light unit having a distributive power source for energization of light segments in selected patterned relations dependent upon the visual result sought.

A feature of the invention lies in its capability to provide desired visual effects with low power consumption, and in view of its operability with a small power source at a relatively low voltage it can be made into a construction of extremely small is and light weight size.

The electroluminescent screen can be made in any of a wide range of sizes and can be made flexible or rigid and of different thicknesses as needs and uses dictate.

Other objects and features which are believed to be characteristic of my invention are set forth with particularity in the appended claims. My invention, however, both in organization and manner of construction, together with further objects and features thereof, may be best understood with reference to the following description taken in connection with the accompanying drawings.

A BRIEF DESCRIPTION OF THE DRAWINGS

FIG. 1 illustrates partly schematically an electroluminescent panel assembly of the invention in which four electroluminescent cells are aligned side-by-side to form light emitting strips of a light field according to the invention;

FIG. 2 illustrates partly schematically an electroluminescent panel assembly in which a light emitting layer is activated by a single co-extensive electrode on one side and a plurality of side-by-side electrodes on the other side which are selectively activatable to energize the entire light field or only portions of the light field as desired;

FIG. 3 illustrates an electroluminescent panel assembly of light strips extending from a central region in an outward direction to form a generally circular configuration of light strips;

FIG. 4 illustrates still another circular electroluminescent panel assembly in which the light strips are of different diameters and arranged concentrically;

FIG. 5 illustrates a side elevational view of an arrangement like that of FIGS. 1 and 2 having a layer of light activatable matter thereover;

FIG. 6 is a somewhat schematic view in perspective of an electroluminescent display in laminar form;

FIG. 7 is an enlarged view of a section of the laminar structure of FIG. 6 as taken on line 7;

FIG. 8 is still another enlarged illustration of the is laminar display of FIGS. 6 and 7 illustrating the alignment of light emitting matter and a pealed away carrier of an array of electrodes for the light emitting segments;

FIG. 9 is a broken away illustration of a laminar display of the present invention having two layers of light emitting strips associated with a common central electrode;

FIG. 10 is an enlarged broken away illustration of the laminar assembly of FIG. 9;

FIG. 11 is a plan view of another laminar display area of the type shown in FIGS. 9 and 10 in which the two layers of light emitting segments are aligned at right angles to each other; and FIG. 12 is a plan view of another arrangement of the laminar display area of FIGS. 9 and 10 in which the two layers of light emitting segments are aligned in diagonal relationship to each other.

DESCRIPTION

Turning to the drawings in greater detail, FIG. 1 illustrates four electroluminescent cells 30 disclosed in our earlier filed applications which form strips lined in side-by-side relation and mounted on a base 38 of suitable rigid material such as chipboard to provide a light field made up of the four cells 30. Each of the cells is energized by way of a pair of conductors, a conductor 31 common to each cell and a conductor 32, which are connected to a power source 35 having individual switches 36 illustrated schematically associated therewith for selective energization of any one or more of the cells or all of them simultaneously to cause light to be emitted from selected portions of the light field or the entire light field. Although only four are shown in the panel assembly illustrated, it will be recognized that any number of light cells can be utilized. The spaces between the light cells provide dark regions which can act as guidelines such as for writing paper placed over the assembly for writing purposes.

FIG. 2 illustrates another arrangement of the invention in which electrically activatable light emitting matter of a lighting unit 40 is sandwiched between a coextensive electrode 42 and a plurality of independently and selectively activatable electrodes 43 on the opposite side. As illustrated, the electrodes 43 are transparent electrodes such as a tin oxide layer while the opposite electrode 42 may be of aluminum. Where use indicates a greater desirability of inverting this arrangement, however, the plurality of electrodes on one side of the activatable material may be opaque such as aluminum strips while the opposite side electrode common to the entire light of the electrically activatable material 41 may be a layer of tin oxide. Each of the electrode strips 43 is connected to a separate conductor 47 while the common electrode 41 is connected to a conductor 46. Both conductors 46 and 47 are connected to a power source 45 which energizes by switch selection any one or more of the electrodes 43 to permit energization of a portion of the light field or the entire light field as desired. The spaces between the electrodes 43 can be made to any width desired and in not being energized can be of size to provide dark regions between the light emitting regions which can be utilized as guidelines for writing in the dark when writing paper is placed over the light emitting field.

The circuitry of the power source 45 can be provided with a switching circuit of conventional clock type arranged to effect a progressive sequential energization of the light strips of the assembly. The frequency of energization of the strips can be at a slow rate for a visible effect of progression, or at a more rapid rate to produce the effect of a coherent light output from the entire light field or selected portions of the light field. Thus the power consumption for the total area lighted can be made small relative to a constant energization of the area since only one segment of the total field is energized each instant. Thus a power source only as large as is required to light a segment of the field is necessary and this can be switched electrically among the remaining segments of the lighted portion of the field at a rate sufficient that the normal eye persistence of an observer will cause an impression of a constant light output.

By way of example, if the frequency of energization is 600 hertz and 10 segments of a field are to be lighted, the power source can be switched to energize each segment at a rate of 30 times a second for a period of two hertz per energization which is quite adequate due to human eye persistence to provide the effect of a steady light output.

The light output can be imparted an appearance of greater stability by providing a thin layer or sheet of light activatable light emitting phosphorescent matter over the light field. Such as in an arrangement illustrated in FIG. 3 wherein a layer of light activatable phosphorescent matter 68 is placed over the light emitting surface of an electroluminescent lighting unit 60. The layer 68 is activated by the electroluminescent light emitted by the unit which is also visible through the layer 68. Thus a more persistent light output is produced by a combination of light activatable light and the light of electrically activated phosphorescent matter which is visible at the surface of the unit 60. The electrically activated light emitting matter 61 is energized between electrodes 63 and a common electrode 62 and the entire combination can be sealed against moisture between layers of polytetrafluoroethylene not shown. Thus a steadier and more persistent light output can be provided from the unit by reason of the slower light energy release or greater persistence of the overlying light activatable matter energized by the electrically energized light emitting matter.

Alternately, the electrically activated light emitting matter 61 can be provided in the form of a layer of microencapsulated particles in which the particles or small particle clumps are individually sealed against moisture in a light transmissive moisture resistant sheath such as a resinous film like a polyester also transmissive to the light activating electrical energy for production of emitted light. The overlying layer of light activatable phosphorescent matter 68 placed over the light activatable matter can similarly be provided in the form of microencapsulated particles sealed in individual sheaths of moisture resistant light transmissive material. The overlying layer also can be of fluorescent material activated by the light of the electrically activated light emitting matter. The fluorescent matter can be on a light transmissive carrier film and can be selected to emit light of a different color from light emitted by the electrically activated light emitting matter, for example, red activated by green light.

As still another arrangement, microencapsulated light activatable phosphorescent particles can be intermixed or interlayered in light exposed relation to the microencapsulated particles of electrically activatable light emitting matter to provide a greater light persistence than is obtained from the electrically activatable matter alone. Similarly the color of light emitted by the phosphorescent matter may be different from that of the light radiated by the electrically activated light emitting matter. Fluorescent particles alone or in combination with microencapsulated phosphorescent particles can also be intermixed or interlayered in light exposed relation to the microencapsulated electrically activated light emitting particles, each material being arranged to emit the same or different colored light.

In another arrangement, two or more different microencapsulated electrically activatable light emitting phosphors selected to produce different colored light outputs at different voltages or frequencies can be intermixed and interposed between overlying conductive electrodes, one or both of which are light transmissive.

FIGS. 4 and 5 illustrate additional arrangements of electroluminescent segments for flexible adaptability to other use. FIG. 4 shows an arrangement of longitudinal light strips 71 and 72 aligned end to end on a base 73 of a lighting unit 70. An arrangement such as is illustrated lends itself to assemblage as a clock with analog appearing indication on a clock face. The lighting strips 71 and 72 are activated digitally by a power and timer circuit 75 located centrally of the array connected to the lighting strips by connecting leads 76 and 77 schematically illustrated.

To further illustrate the wide range of application the lighting strips can be oriented in a concentric circle array 80 as shown in FIG. 5 wherein the light field is made up of circular lighting strips 81 which are energized by a power switching circuit 85 located centrally and connected to the strips by way of conductors of a cable 86. Although circular light strips are here shown it will be recognized that any shape such as square ellipses or any of a wide variety of shapes might be used in an array extending about a central region or an off center region. The strips 81 can be lit simultaneously or in sequence from the outside to the center or vice versa at different rates for any of a wide range of visual decorative effects. This arrangement as well as that of FIG. 4 also lend themselves to many game possibilities.

FIG. 6 illustrates a laminar display assembly 90 adaptable to being sealed against moisture in which line segments of light emitting material aligned in side-by-side relation similar to lines of a raster of a TV screen are energized by a switching circuit 95 of conventional clock-type arranged to effect a progressive sequential energization of the light segments of the assembly.

As shown in FIG. 7, each of the light lines 91 of light emitting matter of FIG. 6 is provided a base in a groove of a common electrode 92 while an individual electrode 93 narrower than its respective light line 91 in a carrier 98 is arranged to be aligned with its respective line of light emitting matter 91 for effective energization of the light emitting matter according to power signals supplied by the power source 95. The carrier 98 is of transparent material are also preferably transparent to light emitted by the line segments 91. In some cases the electrodes 93 may be made sufficiently thin as to be relatively nonvisible in lights emitted from the line segments 91. As shown more clearly in FIG. 8, the light emitting matter of the assembly of FIGS. 6 and 7 is deposited in grooves 94 provided with reflective surfaces to enhance the emission of light from the light segments. The individual electrodes 93 for association with the light emitting line segments 91 are carried by the light transmissive or transparent carrier or overlayer 98 as shown in the pealed away illustration in FIG. 8. Such line segments 91 can also be embedded in the overlayer 98 where found advantageous such as in fabrication of the assembly.

FIG. 9 illustrates still another arrangement of the invention in which two layers of light line segments are provided in a common electrode 102 shown more clearly in FIG. 10. The light line segments 101 are present in one side of the common electrode while a similar layer of side-by-side aligned line segments are present in the opposite surface of the common electrode and staggered from the aligned segments 101. The common electrode 102 is preferably light transmissive or light transparent electrode and staggered from the aligned segments 101. The common electrode 102 is preferably light transmissive or light transparent so that the two layers of light lines can complement each other from one or both sides of the laminar assembly. Each of the light lines of light emitting matter 101 is provided with a co-extensive narrow electrode 103 preferably of light transparent material carried by a transparent overlayer 108 of the assembly. Similarly the light lines 111 of light emitting matter in the opposite side of the common electrode 102 are each provided with a co-extensive energizing electrode 113 carried by a carrier layer 118 of light transmissive or transparent material.

FIG. 11 illustrates still another arrangement of the light line segments in a two layer laminar display assembly 120 like that of FIGS. 9 and 10 in which the light lines 121 in one surface of the common electrode are aligned in side-by-side parallel relationship while the light lines 124 in the opposite surface of the common electrode are aligned at right angles to the light lines 121.

FIG. 12 illustrates still another possible arrangement of light lines of the present invention like that of FIGS. 9 and 10 in which the light lines of the laminar assembly 130 are crossed in diagonal relationship. That is the light lines 131 in one surface of the common electrode can be aligned in diagonally crossed relation with light lines 134 on the opposite side of the common electrode.

The frequency of energization of the light segments of the invention can be in sequence at a slow rate but preferably is at a more rapid rate to produce the effect of coherent light output from the entire light field or selected portions of the light field. Energization of the light lines in sequence is desirably at a rate sufficient that the normal eye persistence of an observer will cause an impression of a constant light output. In this regard it is possible to provide a coherent light field by sequencing the light segments of a light frame with a frame change occurring at the rate of 30 times per second to produce a raster-like display field. In this respect the display field having 525 closely spaced light lines can be provided energized in sequence 30 times per second to provide, for example, the appearance of a present day video raster of TV screen size in which the lines are energized at a rate to provide a frame change of 30 times per second to produce the desired coherent light output.

In view of the foregoing it will be understood that many variations of the arrangement of the invention can be provided within the broad scope of principles embodied therein. Thus while particular preferred embodiments of the invention have been shown and described, it is intended by the appended claims to cover all such modifications which fall within the true spirit and scope of the invention.

What is claimed is:

1. An electroluminescent light display assembly comprising a laminar light screen including
   a plurality of close side-by-side thin light emitting segments independently activatable to produce a display of light,
   a common electrode directly associated with said light segments,
   said light segments comprising electrically activatable light emitting matter aligned as lines in side-by-side parallel relation in electrical communication with one surface of said common electrode,
   said line segments including a series of individual thin-line electrodes each narrower than and directly associated in coextensive aligned relation with the light emitting matter of a respective one of said light segments to activate said light segment, a power source connected for energization of each of said light segments, switching means effective to energize said light segments in repeated patterned sequence and at a frequency of repetition of said sequence to produce the visual effect of a steady unified display of light.

2. An electroluminescent light display assembly as set forth in claim 1 in which said thin-line electrodes are of light transmissive material.

3. An electroluminescent light display assembly as set forth in claim 1 in which each of said lines of light emitting matter is present in a groove in said common electrode.

4. An electroluminescent light display assembly as set forth in claim 1 in which said thin-line electrodes are mounted in a light transmissive carrier overlying and coextensive with said common electrode.

5. An electroluminescent light display assembly as set forth in claim 4 in which each of said thin-line electrodes is present in a groove in said overlying carrier.

6. An electroluminescent light display assembly as set forth in claim 1 in which said common electrode is of light transmissive material.

7. An electroluminescent light display assembly as set forth in claim 6 in which said light segments comprise light emitting matter aligned as lines in side-by-side parallel relation in layers on opposite sides of said common electrode.

8. An electroluminescent light display assembly as set forth in claim 7 in which said light emitting lines on opposite sides of said common electrode are parallel to each other but those on each side being staggered relative to those on the other side.

9. An electroluminescent light display assembly as set forth in claim 7 in which said light emitting lines on opposite sides of said common electrode are aligned in diagonally crossing relation to each other.

10. An electroluminescent light display assembly as set forth in claim 7 in which each of said lines of light emitting matter is present in a groove in said common electrode.

11. An electroluminescent light display assembly as set forth in claim 7 in which said thin-line electrodes are mounted on separate light transmissive carriers each overlying in coextensive relation with a layer of said lines of light emitting matter on opposite sides of said common electrode.

12. An electroluminescent light display assembly as set forth in claim 11 in which said thin-line electrodes in each of said carriers is present in a groove in its respective overlying carrier.

13. An electroluminescent light display assembly comprising a laminar light screen including a pair of layers of closely spaced thin parallel side-by-side light emitting segments, one of said pair of layers of segments overlying the other of said layers, said light segments of both said layers being independently activatable to produce a display of light from each of said layers, a common electrode disposed between said layers and being associated with the light segments of both of said layers, said light segments each comprising electrically activatable light emitting matter aligned as a line in electrical communication with a surface of said common electrode, said line segments including a series of individual thin-line electrodes each narrower than and directly associated in coextensive aligned relation with the light emitting matter of a respective one of said light segments adapted to activate said light segment, a power source connected for energization of each of said light segments, switching means effective to energize said light segments in patterned sequence repetitively at a frequency to produce a desired light output from each of said layers.

14. An electroluminescent light display assembly as set forth in claim 13 in which said common electrode is of light transmissive material.

15. An electroluminescent light display assembly as set forth in claim 14 in which said thin-line electrodes are of light transmissive material.

16. An electroluminescent light display assembly as set forth in claim 15 in which said parallel light emitting lines of each of said layers is staggered in alignment relative to the light emitting lines of the other of said layers.

17. An electroluminescent light display assembly as set forth in claim 15 in which said light emitting lines in layers on opposite sides of said common electrode are aligned in diagonally crossing relation to each other.

* * * * *